J. J. SHOEMAKER AND C. C. COX.
METHOD OF MANUFACTURING TIRE INNER TUBES.
APPLICATION FILED MAR. 8, 1919.
1,341,247.
Patented May 25, 1920.
2 SHEETS—SHEET 2.
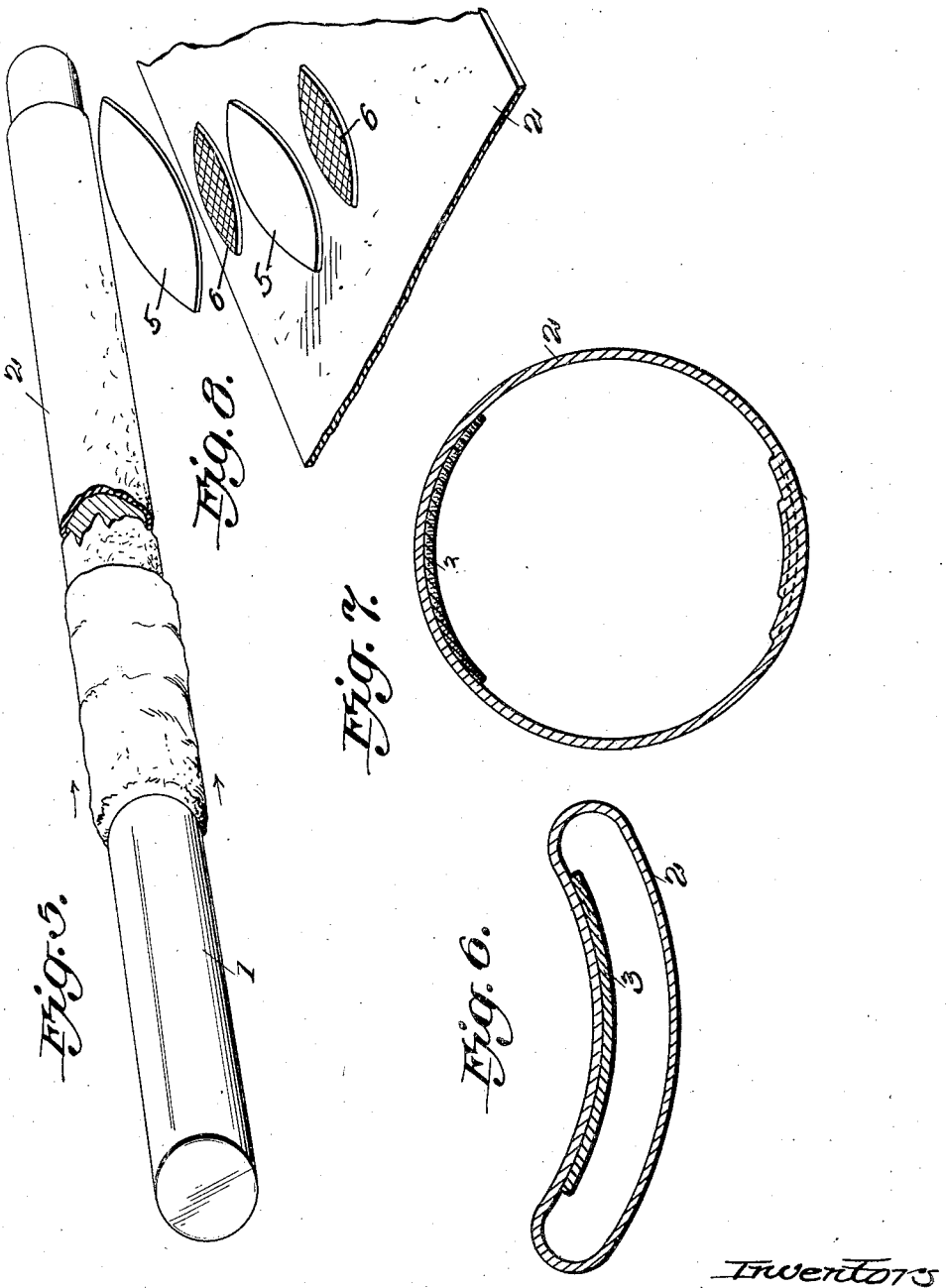

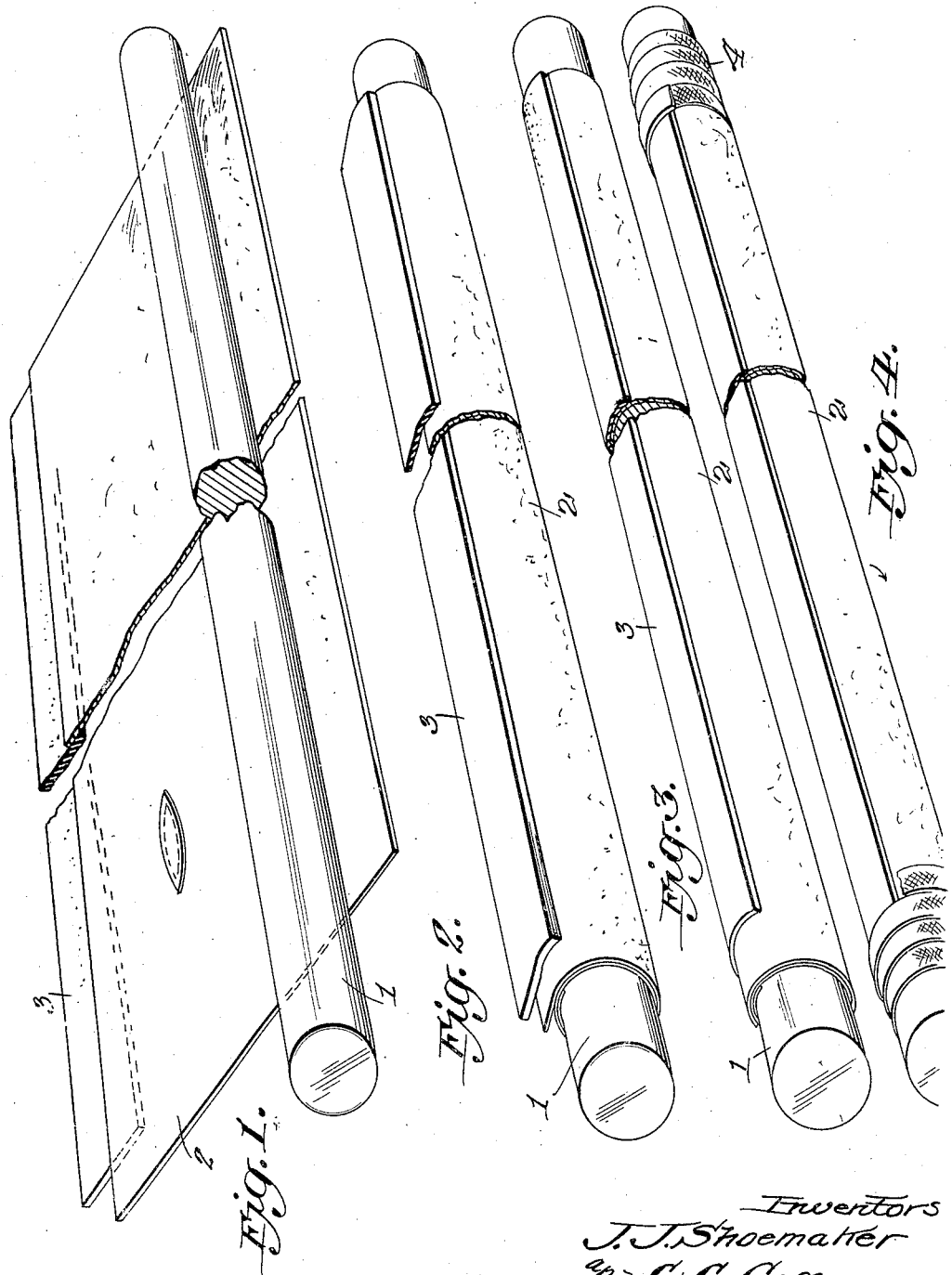

UNITED STATES PATENT OFFICE.

JEREMIAH J. SHOEMAKER AND CHARLES C. COX, OF AKRON, OHIO.

METHOD OF MANUFACTURING TIRE INNER TUBES.

1,341,247.   Specification of Letters Patent.   Patented May 25, 1920.

Application filed March 8, 1919. Serial No. 281,379.

*To all whom it may concern:*

Be it known that we, JEREMIAH J. SHOEMAKER and CHARLES C. COX, citizens of the United States, residing at Akron, in the county of Summit and State of Ohio, have invented certain new and useful Improvements in Methods of Manufacturing Tire Inner Tubes, of which the following is a specification.

This invention relates to a novel method of manufacturing the inner tubes of rubber tires, and in a specific sense to the manufacture of a puncture-proof inner tube.

One object of the present invention is to evolve a method whereby a tire inner tube may be readily and expeditiously manufactured at a low cost and without the necessity of employing lathes or other machinery as has heretofore been done in order to produce such a tube.

Another object of the invention is to evolve a method of manufacturing tire inner tubes by which method a tube of uniform thickness and strength throughout may be produced and by which method the tube may be provided with an integral puncture-proofing portion which, in the finished tube, will be so positioned and possess such characteristics as to effectually prevent deflation of the tube if punctured.

In the accompanying drawings:

Figure 1 is a perspective view illustrating the first portion of the first step of the method;

Fig. 2 is a perspective view illustrating the completion of the first step of the method;

Fig. 3 is a similar view illustrating the second step of the method;

Fig. 4 is a similar view illustrating the third step of the method;

Fig. 5 is a similar view illustrating the fifth step of the method;

Fig. 6 is a transverse sectional view through the completed tube deflated;

Fig. 7 is a similar view through the tube inflated, the section being taken in a plane passing through the reinforcement provided at the point of location of the inflating valve;

Fig. 8 is a perspective view illustrating the method of arranging the reinforcement for the tube at the point of location of the inflating valve.

By the method of the present invention, I contemplate manufacturing a tire inner tube such as shown and described in my copending application, filed March 8, 1919, Serial No. 281,380 and as a preliminary to the carrying out of the method, there is provided a mandrel 1 which may be hollow or solid as shown in the drawings, which may be of wood, metal, or any other suitable material or combination of materials, and which is cylindrical and of a length somewhat greater than the length of the completed tube and of a diameter substantially equal to the internal diameter of the said tube when finished. This mandrel may be manipulated free from support or its ends may be disposed upon any suitable supporting means. There is next provided a sheet 2 of thin rubber which is of a length corresponding substantially to the length of the tube to be produced and of a width somewhat greater than the diameter of the mandrel. There is also provided a strip 3 of uncured or semi-cured rubber which is of a length slightly less than the length of the sheet 2 and which is disposed against the under face of the said sheet 2 at one longitudinal edge thereof with the strip 3 spaced inwardly at one end from the corresponding end of the said sheet 2 and with one of its lateral portions projecting a suitable distance beyond the said lateral edge of the said sheet 2, as clearly shown in Fig. 1. In carrying out the method, the sheet is disposed longitudinally beneath the mandrel, as shown in Fig. 1 of the drawings, and is then wrapped or rolled about the mandrel so that it will assume a tubular form, as shown in Fig. 2 of the drawings. As the sheet 2 is of a width greater than the circumference of the mandrel 1, one longitudinal edge portion, namely that carrying the strip 3, will overlap another portion of the sheet when the sheet is wrapped about the mandrel as stated above and as shown in said Fig. 2, the projecting lateral portion of the said strip 3 also overlapping the last mentioned portion of the sheet 2 so as to close the seam. This strip 3 is of a width such that it will extend substantially the entire width of the tread portion of the tube when the tube is completed.

The next step in the method, illustrated in Fig. 4 of the drawings, consists in binding the ends of the wrapping 2 and strip 3. This is done by wrapping tape 4 such for example as tire tape, about the ends of the wrapped sheet 2 and the strip 3 applied thereto, so as to snugly bind these ends of the wrapping to the surface of the mandrel 1 and so as to exclude steam in the next step of the method, which step consists in placing the mandrel with the sheet 2, strip 3, and wrappings 4, in any suitable curing oven or the like where the assemblage of parts will be subjected to the heating action of any suitable heat bearing fluid such for example as steam or hot air. By this step, the tubular wrapping is cured so that it resolves itself into an integral tube, and the puncture-proofing strip 3 likewise becomes an integral part of the said tube. As stated, the wrappings 4 serve to prevent entrance of steam or heated air between the tube and the surface of the mandrel and thus the pressure exerted about the tube during the curing operation will not be resisted by any outward pressure which might be caused by the entrance of steam between the said tube and mandrel.

After the tube has been substantially cured, the wrappings 4 are removed and the tube is then stripped from the mandrel in the manner clearly shown in Fig. 5 of the drawings, this stripping being accomplished by turning back one end of the tube upon itself and pulling or stripping the tube off from the mandrel so that in the stripping operation it will be turned inside out. Thus while during the several steps of carrying out the method, the puncture-proofing strip 3 was exteriorly located, in the completed tube as removed from the mandrel, it is interiorly located as shown in Fig. 6 of the drawings, and when the tube is deflated, the tube will assume substantially the form shown in the said Fig. 6. In this form, the puncture-proofing strip 3, which has not been completely cured during the curing step, is of uniform density throughout and assumes a transversely curved form with its concave side presented outwardly so as to face the inner surface of the tread portion of the tire casing. However, it will be understood that when the tube is inflated as shown in Fig. 7 of the drawings, the transversely curved form of the puncture-proofing strip will be reversed so that its concave side will become its convex side and vice versa. Under these conditions, the strip at and adjacent its inner surface or, in other words, its surface which is presented toward the interior of the tube as a whole, will be of greater density than at and adjacent its opposite surface so that should the tube be punctured by any object piercing the tube at the point of location of the said strip, the strip will immediately heal so as to close the puncture, thus automatically repairing the damage done to it and preventing deflation of the tube.

In order to reinforce the tube at the point of location of the inflating valve (not shown) several elliptical pieces of rubber, indicated by the numeral 5, and several similarly shaped pieces 6 of canvas are alternately arranged in superposed relation upon that side of the sheet 2 which is to face the mandrel 1 in the carrying out of the first step of the method and prior to wrapping the sheet about the mandrel and, of course, when the tube is cured the pieces of rubber will become vulcanized with the tube proper and the reinforcing pieces of canvas will become embedded in the reinforcement as shown in Fig. 7.

Having thus described the invention, what is claimed as new is:

1. The method of manufacturing a rubber tire tube which comprises the steps of applying a strip of rubber to one lateral edge portion of a sheet of rubber, wrapping the sheet of rubber about a mandrel with their edge portions overlapped and with the strip covering the seam of the wrapping, subjecting the assemblage to a process of vulcanization, and stripping the product from the mandrel.

2. The method of manufacturing a rubber tire tube which comprises the steps of applying a strip of rubber to one lateral edge portion of a sheet of rubber, wrapping the sheet in tubular form about a mandrel with the strip overlapping the seam of the wrapping, curing the assemblage, and stripping the product from the mandrel.

3. The method of manufacturing a rubber tire tube which comprises the steps of applying a strip of soft rubber to the outer side of a sheet of rubber at one lateral edge thereof, wrapping the sheet in tubular form about a mandrel with the strip overlapping the seam, curing the assemblage, and stripping the product from the mandrel and in doing so turning the product inside out whereby the convex side of said strip is arranged inwardly.

4. The method of manufacturing a rubber tire tube which comprises the steps of applying a strip of soft rubber to a sheet of rubber, wrapping the sheet in tubular form about a mandrel to bring one edge portion into position overlapping another portion of the sheet and with the strip overlapping the seam, applying a binding medium to the ends of the wrapping and said strip, subjecting the assemblage to a process of vulcanization, removing the binding medium, and stripping the product from the mandrel.

5. The method of manufacturing a rubber tire tube which comprises the steps of applying a strip of soft rubber to a sheet of rubber at one longitudinal edge, wrapping the sheet in tubular form about a mandrel to bring the longitudinal edge of the sheet into overlapped relation to another portion of the sheet and with the strip covering the seam, applying a binding medium to the ends of the wrapping and the said strip, subjecting the assemblage to a process of vulcanization, removing the binding medium, and stripping the product from the mandrel and in doing so turning the product inside out, whereby the convex side of said strip of soft rubber is presented inwardly.

6. The method of manufacturing tire tubes which consists of arranging a sheet of rubber in tube formation, arranging a strip of rubber over the meeting portions of said sheet and subsequently uniting said sheet and said strip, said strip of rubber being extended longitudinally of said tube.

7. The method of manufacturing tire tubes which consists in arranging a sheet of rubber into tube formation with its edge portions overlapped, arranging a strip of rubber over the meeting portions of said sheet and uniting said strip and said sheet, said strip of rubber being extended longitudinally of said tube.

8. The method of manufacturing tire tubes which consists in arranging a sheet of rubber in tubular formation with its edge portions overlapped, arranging a strip of rubber over the meeting portions of said sheet, uniting said strip and said sheet by a vulcanizing process and subsequently reversing the tube thus formed, whereby said strip has its convex side presented inwardly.

In testimony whereof we affix our signatures.

JEREMIAH J. SHOEMAKER. [L. S.]
CHARLES C. COX. [L. S.]